US007950587B2

(12) United States Patent
Henson et al.

(10) Patent No.: US 7,950,587 B2
(45) Date of Patent: May 31, 2011

(54) DEVICES AND METHODS FOR STORING DATA

(75) Inventors: James M. Henson, Reno, NV (US); Stephan R. Fuelling, Reno, NV (US)

(73) Assignee: The Board of Regents of the Nevada System of Higher Education on behalf of the University of Reno, Nevada, Reno, NV (US)

( * ) Notice: Subject to any disclaimer, the term of this patent is extended or adjusted under 35 U.S.C. 154(b) by 87 days.

(21) Appl. No.: 11/903,815

(22) Filed: Sep. 24, 2007

(65) Prior Publication Data

US 2008/0074787 A1    Mar. 27, 2008

Related U.S. Application Data

(60) Provisional application No. 60/846,786, filed on Sep. 22, 2006.

(51) Int. Cl.
*G06K 19/06* (2006.01)
(52) U.S. Cl. ...................................................... 235/493
(58) Field of Classification Search .................. 235/449, 235/380, 492, 493
See application file for complete search history.

(56) References Cited

U.S. PATENT DOCUMENTS

| | | |
|---|---|---|
| 3,571,799 A | 3/1971 | Coker et al. |
| 3,743,134 A | 7/1973 | Constable et al. |
| 3,784,796 A | 1/1974 | Namikawa et al. |
| 3,864,754 A | 2/1975 | Miklos et al. |
| 3,873,975 A | 3/1975 | Miklos et al. |
| 3,878,367 A | 4/1975 | Fayling et al. |
| 3,986,205 A | 10/1976 | Fayling |
| 3,986,206 A | 10/1976 | Fayling |
| 3,998,160 A | 12/1976 | Pearce |
| 4,023,204 A | 5/1977 | Lee |
| 4,038,596 A | 7/1977 | Lee |
| 4,040,108 A | 8/1977 | Nakata |

(Continued)

FOREIGN PATENT DOCUMENTS

GB         1331604         9/1973

OTHER PUBLICATIONS

Conti et al., "Macroscopic Behaviour of Magnetic Shape-Memory Polycrystals and Polymer Composites," White Paper, 4 pgs., (2006).

(Continued)

*Primary Examiner* — Daniel A Hess
*Assistant Examiner* — Tabitha Chedekel
(74) *Attorney, Agent, or Firm* — Klarquist Sparkman, LLP (57) ABSTRACT

Data-storage devices and methods are disclosed. An exemplary data-storage device includes a medium having at least two dimensions and having a surface. Multiple data-containing loci are arranged on the surface. Each locus has a respective amount of magnetically responsive particles. The respective amounts are different in at least some of the loci. The respective amount at a particular locus corresponds, at least in part, to a respective unit of data contained by the locus. The loci can be substantially two-dimensional or three-dimensional, the latter being configured as respective holes, containing respective amounts of magnetically responsive particles, extending depth-wise into the medium. The loci typically range in size from the micrometer range to the nanometer range. The medium can be any of various configurations such as cards, sheets, films, etc.

20 Claims, 3 Drawing Sheets

U.S. PATENT DOCUMENTS

| | | |
|---|---|---|
| 4,081,132 A | 3/1978 | Pearce |
| 4,104,513 A | 8/1978 | Pearce |
| 4,114,029 A | 9/1978 | Lee |
| 4,125,844 A | 11/1978 | Bretschneider et al. |
| 4,158,862 A | 6/1979 | Michaud et al. |
| 4,173,026 A | 10/1979 | Deming |
| 4,186,944 A | 2/1980 | Pearce |
| 4,197,989 A | 4/1980 | Pearce |
| 4,215,812 A | 8/1980 | Chancel |
| 4,218,674 A | 8/1980 | Broscow et al. |
| 4,228,348 A | 10/1980 | Lee |
| 4,239,959 A | 12/1980 | Gutterman |
| 4,287,544 A | 9/1981 | Lazzari |
| 4,467,383 A | 8/1984 | Ohta et al. |
| 4,593,336 A | 6/1986 | Sansom |
| 4,626,669 A | 12/1986 | Davis et al. |
| 4,639,584 A | 1/1987 | Haghiri-Tehrani et al. |
| 4,739,377 A | 4/1988 | Allen |
| 4,743,490 A | 5/1988 | Fayling |
| 4,745,267 A | 5/1988 | Davis et al. |
| 4,774,593 A | 9/1988 | Deguchi et al. |
| 4,863,196 A | 9/1989 | Ohnishi et al. |
| 4,887,171 A | 12/1989 | Rose |
| 4,906,988 A | 3/1990 | Coppella |
| 4,912,585 A | 3/1990 | Belser et al. |
| 5,142,513 A | 8/1992 | Takehara et al. |
| 5,208,799 A | 5/1993 | Nakao et al. |
| 5,289,202 A | 2/1994 | Yamane et al. |
| 5,350,618 A | 9/1994 | Togawa et al. |
| 5,402,410 A | 3/1995 | Yoshimura et al. |
| 5,424,523 A | 6/1995 | Ohno et al. |
| 5,679,942 A | 10/1997 | Toyama |
| 5,741,435 A | 4/1998 | Beetz, Jr. et al. |
| 5,762,263 A | 6/1998 | Chamberlain, IV |
| 5,764,060 A | 6/1998 | Gonzalez et al. |
| 5,853,846 A | 12/1998 | Clark et al. |
| 5,917,326 A | 6/1999 | Gonzalez et al. |
| 5,949,050 A * | 9/1999 | Fosbenner et al. ............ 235/449 |
| 5,972,438 A * | 10/1999 | Suzuki et al. ................. 427/548 |
| 5,981,053 A | 11/1999 | Naylor et al. |
| 5,988,500 A | 11/1999 | Litman |
| 5,993,937 A | 11/1999 | Birukawa et al. |
| 6,053,406 A | 4/2000 | Litman |
| 6,114,646 A | 9/2000 | Montgomery |
| 6,146,740 A | 11/2000 | Birukawa et al. |
| 6,257,488 B1 | 7/2001 | Robertson et al. |
| 6,403,169 B1 | 6/2002 | Hardwick et al. |
| 6,468,678 B1 | 10/2002 | Dahlin et al. |
| 6,598,793 B1 | 7/2003 | Fisher et al. |
| 6,834,251 B1 | 12/2004 | Fletcher |
| 6,902,807 B1 | 6/2005 | Argoitia et al. |
| 6,970,379 B2 * | 11/2005 | Parkin ........................... 365/173 |
| 7,045,049 B1 | 5/2006 | Natan et al. |
| 7,047,883 B2 | 5/2006 | Raksha et al. |
| 7,161,875 B2 | 1/2007 | Sharma |
| 7,225,082 B1 | 5/2007 | Natan et al. |
| 7,241,489 B2 | 7/2007 | Argoitia et al. |
| 7,258,915 B2 | 8/2007 | Argoitia et al. |
| 7,300,695 B2 | 11/2007 | Argoitia et al. |
| 7,381,450 B1 | 6/2008 | Waltham et al. |
| 2005/0017082 A1 * | 1/2005 | Moran et al. ................... 235/493 |
| 2005/0161119 A1 | 7/2005 | McKinght et al. |

OTHER PUBLICATIONS

Feuchtwanger, Jorge, "Energy Absorption in Ni-Mn-Ga/ Polymer Composites," Ph.D. Thesis, Massachusetts Institute of Technology, 143 pgs., (2006).

Zhang et al., "Three Dimensional Alignment of Magnetic Particles," *J. Appl. Phys.* 81 (8) 5647-5649, (1997).

Zhang and Budnick, "Dynamic Alignment of Magnetic Materials," *Appl. Phys. Lett.* 70 (9), 1083-1085, (1997).

Conti et al., "Modeling and simulation of magnetic shape-memory polymer composites," White Paper, 31 pages, (2006).

* cited by examiner

DEVICES AND METHODS FOR STORING DATA

PRIORITY CLAIM

This application claims priority to, and the benefit of, U.S. Provisional Application No. 60/846,786, filed on Sep. 22, 2006, which is incorporated herein by reference in its entirety.

FIELD

This invention relates to, inter alia, data-storage devices having applications in, for example, information storage, data security, intelligent media, and any of various other applications. More specifically, the data-storage devices contain data that can be stored and read in a secure manner and that cannot be easily modified or erased.

BACKGROUND

Various schemes for storing data magnetically are known that permit the stored data to be recalled conveniently for use. For example, recording sounds and/or images on magnetic tape, comprising a thin, flexible, ribbon-like substrate coated with a magnetic medium, is well known and has been used for years. The sound or image data can be stored in analog form or digital (binary) form. The recorded data is read off the tape using an appropriate "reader." Another major use of magnetic data storage is floppy disks and hard disks used with virtually every laptop or larger computer currently in use. These devices normally store data in digital binary form.

The general concept of storing data magnetically is also used in most, if not all, transactions involving credit cards, debit cards, identity cards, passcards, phone cards, transportation tickets, and the like. Many types of such cards and analogous devices include one or more strips of magnetic data-storage medium that can be read and processed as required in the course of the transaction. This form of data storage is aimed at providing some degree of security of the transaction, and also greatly increases the speed and number of transactions that an be executed, per unit time.

Yet another form of magnetically based data storage is the use of magnetic "inks" on transactional and commercial documents such as bank checks, deposit slips, securities, order sheets, and the like. For example, account numbers and other information typically is printed along the bottom margin of bank checks using a type of magnetic ink and a particular font. Some consideration has been given to using analogous inks on currency as an anti-counterfeiting measure. In this latter regard, use of magnetic-based compositions has been combined with other techniques such as diffractive techniques. An example of this is discussed in U.S. Pat. No. 6,902,807 to Argoitia, incorporated herein by reference.

A disadvantage of these various conventional magnetically based data-storage techniques is that the data-storage capacity is limited, at least in part, as a result of the data being stored in binary form. At a particular locus in a binary data-storage device, a data bit is stored as one of two possible states, namely "0" or "1". Consequently, storing binary data requires a large amount of data-storage space. Another disadvantage is that the resolution of data storage and recall is limited in these devices largely by the devices' two-dimensional configurations.

Another disadvantage is the ease in which the data can be destroyed or at least corrupted, accidentally or deliberately. For example, passage of a credit card or debit card over or through a strong magnetic field can erase or change some or all the information on the card's magnetic strip.

Another disadvantage of conventional data-storage techniques is the vulnerability of the data to theft or unscrupulous use. Theft simply requires the thief to have a magnetic reader, and the thief need not have possession of the data-storage device any longer than the instant during which the device is being covertly read.

Hence, there remains a need for improved data-storage devices and methods.

SUMMARY

The need articulated above is met by data-storage devices and methods as disclosed herein.

An embodiment of a data-storage device comprises a medium having a surface. Multiple data-containing loci are distributed on the surface. Each locus has a respective amount of magnetically responsive particles. The respective amounts are selected from a range of amounts and are different in at least some of the loci, wherein the respective amount at a particular locus corresponds, at least in part, to a respective unit of data contained by the locus. In view of their usual appearance when viewed as a plan view, the loci are also termed "dots" herein. The dots typically range in size from the micrometer range to the nanometer range.

The magnetically responsive particles in each locus can be of a respective type selected from a range of multiple selectable types, such that at least some of the loci have different types. The selectable types differ from each other by at least one characteristic selected from the group consisting of material type, particle size, particle shape, particle density, and particle distribution. The selected type at a particular locus corresponds, at least in part, to the respective unit of data contained by the locus, and can provide the particular locus with a respective shade or "color" of magnetic response.

In some embodiments the loci extend respective depths into the medium. The depths desirably correspond, at least in part, to the respective units of data contained by the loci. Data arranged depth-wise in this manner are extremely difficult or impossible to corrupt or erase, especially without destroying the medium. Alternatively or in addition, the loci can have respective widths corresponding, at least in part, to the respective units of data contained by the loci.

The loci can be arranged so as to encode the data in a spatial manner for additional security.

In an embodiment of a method for storing data, a supportive medium is provided that has a surface. The data to be stored are distributed into multiple data units, wherein the data units are represented, at least in part, by a respective amount or number of magnetically responsive particles. Hence, at least some of the data units have different respective numbers of particles. An arrangement of the data-containing loci is formed on the surface. The loci are provided with respective amounts of magnetically responsive particles, wherein the amounts correspond to the respective data units, thereby storing the respective data units (and thus the data) in the loci. Providing the loci with respective amounts of magnetically responsive particles can be performed by providing each locus with a hole having a respective depth and/or volume and filling the holes with respective amounts of magnetically responsive particles. Alternatively, the loci can be surficial loci ("dots") with different respective widths. Further alternatively, each data-containing locus can be configured with a respective combination of depth and width. The holes and/or dots can all have the same magnetically responsive material or can selectively have different magnetically responsive materials.

The foregoing and additional features and advantages of the invention will be more readily apparent from the following detailed description, which proceeds with reference to the accompanying drawings.

BRIEF DESCRIPTION OF THE DRAWINGS

FIGS. 2(A) and 2(B) depict a data-storage device according to the second representative embodiment, which comprises micro- or nano-sized dots of magnetic "ink" (suspension of magnetically responsive particles) deposited on the surface of a substrate, such as a thin film.

FIG. 4 depicts a situation in accordance with the third representative embodiment, in which the loci can selectively have a respective "color" or shade in addition to their respective magnetic properties. The colors can be selected from, for example, a range of visible-light colors or a range of colors in another range of electromagnetic radiation. Shades can be, e.g., gray shades or other color shade. The larger the number of specific selectable dot colors (in addition to loci widths and/or loci depths), the greater the possible information content of the loci. E.g., if four colors or shades are used, as shown, then each locus can represent any of eight possible data states, compared to only two with conventional binary (1,0) data. The respective data unit and/or data state of each color is pre-defined and is interpreted during optical reading and decoding of the data, in addition to magnetic reading of the data.

FIGS. 5(A) and 5(B) are respective cross-sections of two possible cuts in strips arranged along a suitable medium, as described in the fourth representative embodiment. The strips are respectively engraved, cut, or etched (e.g., by a laser beam or electron beam) to form respective "cuts" in the strips.

DETAILED DESCRIPTION

This disclosure is set forth in the context of various representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" means electrically, electromagnetically, or optically coupled or linked and does not exclude the presence of intermediate elements between the coupled items.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, a "data-storage device" is any device on which data is stored, according to the principles disclosed herein, and from which the stored data can be recalled or "read." Hence, a data-storage device encompasses cards, documents, appliques, and things. Exemplary cards are "credit" cards, debit cards, identity cards, pass cards, inventory cards, membership cards, data cards, and the like. Exemplary documents are banknotes, currency, securities, bonds, contracts, identity documents, authenticity documents, tags, commercial documents, entertainment media, and the like. Exemplary appliques are stickers, decals, labels, placards, and the like. Exemplary things are computer memories, other electronically read memory devices, tapes, disks, chips, chip assemblies, packages, and the like, as well as apparatus including one or more of these.

Various embodiments as described below provide, inter alia, more efficient data storage and, in many instances, more secure data storage than conventional data-storage devices and methods.

First Representative Embodiment

Figure 1:
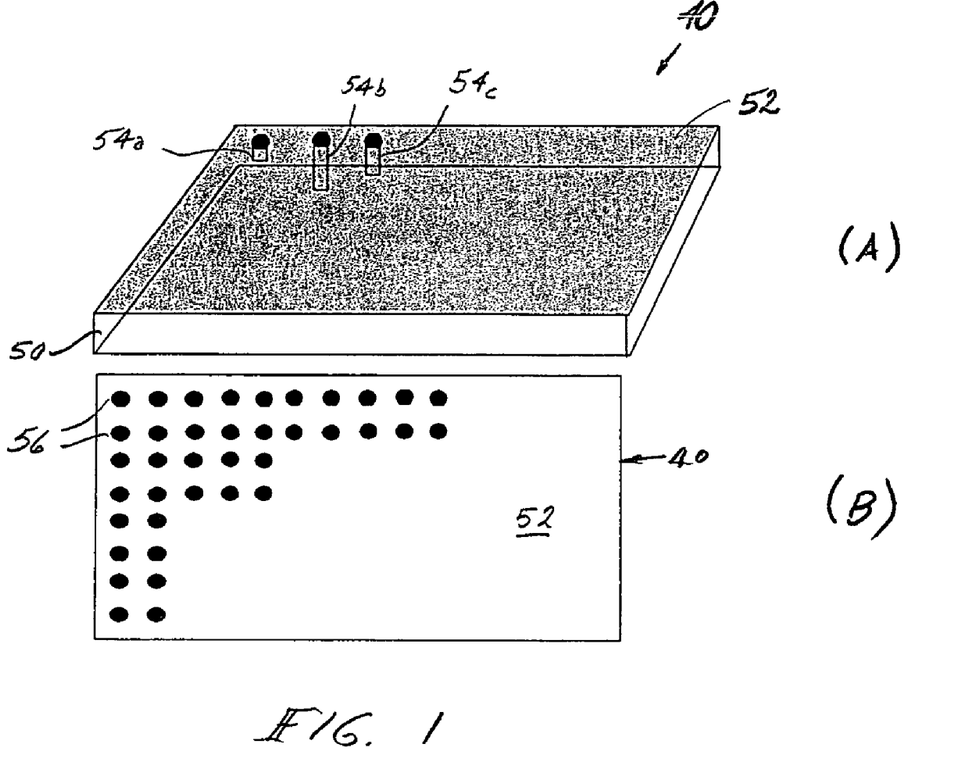
FIG. 1(A) is a perspective view of the first representative embodiment, in which small micro- or nano-sized holes of varying depths and/or diameter are formed as an array on or in the surface of a three-dimensional medium. The surface of the medium is inked with a suspension of magnetically responsive particles. As a result of varying hole depth (and possibly varying hole width), the holes exhibit varying magnitudes of detectable magnetic responses.
FIG. 1(B) is a plan view of the first representative embodiment.

A data-storage device 40 according to this embodiment comprises a three-dimensional medium 50 having a surface 52 on which micro- or nano-sized holes 54a, 54b, 54c, ..., of varying depths and/or widths are formed (e.g., using a drill, laser, or punch, using a lithographic method, using an ion-etching method, by casting, etc.). The holes desirably are in an array on the surface 52 and extend depthwise into the medium 50, as shown in FIGS. 1(A)-1(B). Each hole represents a respective "locus" that stores a respective unit of data. The characteristics of the unit of data are determined, at least in part, by the depth and/or width of the hole. In other words, a key step in recording data in or on the device for storage purposes is forming the holes. FIG. 1(A) is a perspective view, and FIG. 1(B) is a top plan view of the device 40. The holes 54a, 54b, 54c, ..., are not limited to round profiles; they can be any desired profile such as polygonal, elliptical, oblong, etc.

The medium 50 can be any of various rigid, non-magnetic materials, depending upon the application and intended usage environment. The medium 50 also desirably is not electrically conductive. Example materials include, but are not limited to, plastics, cast resins, glasses, webs, and the like. The material can be a composite material. The material desirably is sufficiently rigid, under normal-use conditions, to maintain the integrity of the array of holes and of the holes themselves. The material also desirably is suitable for the particular manner in which the holes are formed, and desirably does not weaken or obstruct magnetic fields applied to it.

To complete data recordal, the holes 54a, 54b, 54c, ..., are filled with one or more magnetic "inks." Viewed from above, each ink-filled hole appears as a respective "dot" 56. Each dot represents a respective locus. All the holes can be filled with the same ink or different holes can be selectively filled with different respective magnetic inks. A magnetic ink is a fluid suspension (desirably a liquid suspension) of magnetically responsive particles. The carrier fluid desirably has a sufficiently low viscosity to enter and fill the holes readily, depending at least in part upon the method used for introducing the ink ("inking"). The carrier liquid desirably is one in which the particles are readily dispersed without clumping or the like. The carrier liquid can include a binder or the like for improved adhesion of the particles to each other and to the walls of the holes.

Desirably, after inking, at least some of the carrier fluid is removed by, for example, evaporation. This step is termed "drying" or "curing" the ink, upon completion of which the magnetically responsive particles are left behind in the holes along with the binder (if used).

The magnetically responsive particles in each of different inks desirably have a different composition or other property that confers a correspondingly different magnetic-response characteristic from one ink to another. With respect to composition, the particles can be made of any material that responds to an applied magnetic field; thus, the particles are termed "magnetically responsive." Such materials include, but are not limited to, iron, nickel, cobalt, iron oxide, and alloys and mixtures of these metals. The particles in the ink desirably are very small, having a mean or median diameter in the range of, for example, micro- or nano-sized particles. (The size range is not limited to the micro- and nano-range.) The particles can be deliberately shaped (e.g., symmetrically shaped) or can have irregular shapes. Altering particle shape is one way in which magnetic responsiveness can be altered. A given ink can have particles that are all the same composition, size, and/or shape, or can be particular mixture of particles of different composition, size, and/or shape.

Adding ink to the holes 54a, 54b, 54c, ..., can be accomplished by any of various methods. For example, all the holes can be filled with the same ink, which can be performed simply by applying the ink to the surface 52 of the medium, followed by wiping, squeegeeing, or the like to force inks into the holes and remove excess ink that does not enter the holes. Alternatively, the holes 54a, 54b, 54c, ..., can be individually inked, either with the same ink or selectively with different inks. Other exemplary ink-introduction methods include, but are not limited to, screen printing, sputtering, spraying, ink-jet printing, other types of printing, and lithography.

If all the holes receive the same ink, then the particle density of ink in each dot 56 will be the same, but holes of different depths and/or widths will have different respective amounts of magnetic particles in them. Also, since every inked hole having the same width and depth receives substantially the same amount of magnetically responsive particles, each such locus exhibits substantially the same detectable magnetic response. The magnetic responses of the loci cannot be altered significantly after inking, e.g., by changing their respective hole depths and/or by changing their widths. In other words, by selectively providing each hole 54a, 54b, 54c, ..., with a respective depth and/or diameter and introducing magnetic ink to the holes, each respective locus is durably "programmed" with a respective unit of data.

The respective unit of data stored by each data-containing locus is akin to a pixel in an image. The units of data are not limited to only two data states each, in contrast to conventional data-storage devices that store binary data. In addition to the enhanced data-storage capability of holes having different depths and widths, by selectively filling different holes 54a, 54b, 54c, ..., with different magnetic inks, additional variability of magnetic responsivity can be conferred to the loci. For example, the different inks may have different magnetic particle densities.

After forming the holes 54a, 54b, 54c, ..., and adding magnetic ink to them, an external magnetic field may be applied to the device to orient the magnetic particles in the holes in a particular direction. This step, which can enhance the strength of the fields associated with the magnetically responsive particles when the data stored in the device 40 is read, is optional.

After drying or curing the ink, a protective layer 58 can be formed on the surface 52 of the medium to cover the dots 56. The protective layer 58 can be a plastic or other suitable film- or thin-layer-forming material.

As noted, the achievable density of data storage in the device 40 is a function of several variables, such as the number of dots 56, the number of discrete hole depths among the dots, the number of discrete hole widths, the number of inks used that have significantly different magnetic responsivities, and the spaces between adjacent dots. These variables are independently selectable in terms of magnitude or value, providing each dot 56 with even greater data-storage capacity than if the dots only had one variable (e.g., depth or width). For example, if eight different hole depths are used, then each dot 56 can represent any of eight possible data states, compared to only two in conventional binary (1,0) data storage. But, with eight selectable hole depths and eight selectable dot widths, each dot can represent data selected from $8^2=64$ distinct values.

The device 40 also can also be used to represent or store two-dimensional N grey-level (or other "color"-level) image data, in which each dot 56 represents a respective pixel of the image.

Figure 3:
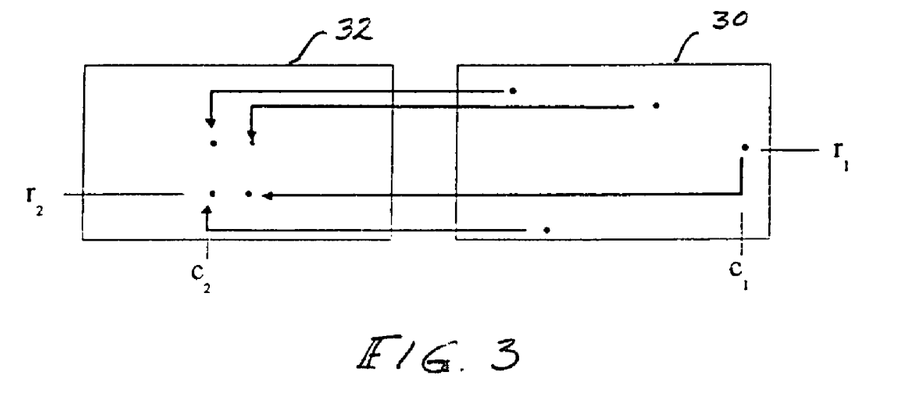
FIG. 3 depicts an exemplary manner in which data as stored can be spatially encoded. In the figure the data or image portions are spatially encoded on or in the medium; during data reading the data are decoded in two dimensions using array (row, column) translation tables.

Data can be stored by the device 40 in a spatially encoded manner for increased security. As shown in FIG. 3, data and/or imagery can be spatially encoded (30) in the device and then decoded in two dimensions (32) using array (row, column) translation tables. To illustrate, again referring to FIG. 3, data located at $(r_1, c_1)$ in the actual device is re-mapped to $(r_2, c_2)$ during reading and decoding. In other words, the data-storage device 40 is readily configured to receive data so that the actual spatial locations of the data as stored by the device are incorrect, by which is meant that reading of the data without decoding it yields nonsense. A priori knowledge of the correct spatial location for each data locus is used to construct the desired "sense" during reading and data decoding.

The data can be read from the device 40 magnetically using, for example, a magnetic sensor as known in the art (for reading magnetic media). Reading using a magnetic sensor may be facilitated by pre-aligning the particles in the dots before reading. Pre-alignment can concentrate magnetic flux lines in a direction in which the sensor can take advantage of. Since the device 40 is normally not used in a manner by which it may retain magnetic field(s), it is desirable that it be "pre"- or "re"-magnetized as part of the data-reading process. Pre-magnetization can be achieved by passing a magnet (e.g., a simple bar magnet) across the surface 52 in one or more directions. Magneto-resistive (or other) heads or arrays of heads detect and discern the magnetic properties of each dot.

In addition to a magnetic sensor, an optical sensor can be used for detecting information in the array of loci that is not discernible using the magnetic sensor. Such additional information can be encoded, for example, in different locus colors or shades, as discussed above. During use of an optical sensor or other suitable sensor for reading this additional information, it is desirable that any protective material 58 applied over the inked dots be transparent to the wavelength(s) used for optical sensing.

The magnetic sensor (and the optical sensor, if used) desirably has sufficient resolution to distinguish data in one locus versus data in another locus. The resolution of the sensor may dictate the number of possible hole depths and/or the number of possible hole widths that can be exploited in the device 40. The larger the number of hole depths and/or diameters, the greater the number of data units (e.g., data states) and the greater the potential information content of the device 40, especially per unit area of the device. For example, if eight different selectable hole depths are used, then the device 40 can store data representing eight data states, compared to only two data states per locus that are storable in conventional binary-data storage devices. In other words, in this example, each locus can store a data unit represented by any one of eight possible data states rather than only two states. Consequently, the device can store a correspondingly greater amount of data in the same space than a conventional binary storage device.

One significant aspect of this embodiment from the standpoint of data-recording is that the data recorded and stored in the loci cannot, from a practical standpoint, be erased or altered, including accidentally. Attempts at erasure or alteration typically will destroy the device and at least some of the data.

Advantages of this embodiment include, inter alia: (1) The achievable density of data storage by the device is greater than achieved by conventional binary media. (2) The device is resistant to environmental contamination. (3) The data stored in the device is highly resistant to erasure or corruption, either accidental or otherwise. (4) The device is not degraded by repeated reading. (5) The life-span of the device is greater than of conventional media. (6) The device can be used for covertly storing and encoding data and imagery including fingerprint and retinal-scan data. (7) The device is difficult to counterfeit.

Second Representative Embodiment

Figure 2A:
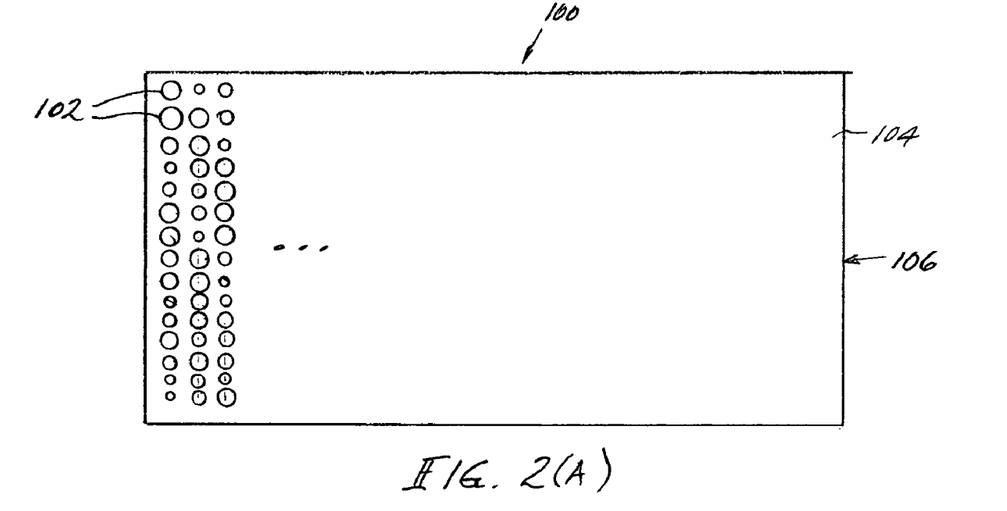
FIG. 2(A) is a top plan view and FIG. 2(B) is a side view.
Figure 2B:
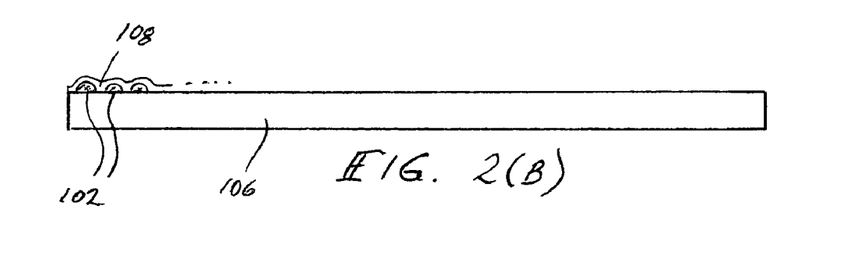

Referring to FIGS. 2(A)-2(B), a data-storage device 100 according to this embodiment comprises a distribution of micro- or nano-sized loci ("dots") 102 on the surface 104 of an appropriate substrate 106 (e.g., thin film). The loci 102 are discrete and can be in an ordered or non-ordered array or distribution. Each locus 102 contains a respective amount and/or type of magnetically responsive particles. The loci 102 are not limited to a round shape; they can be any desired shape such as polygonal, elliptical, oblong, etc. Round loci may be advantageous because they are relatively easy to form, and a large number of them can be placed in a small area. The loci 102 also can be of any desired width within a practical range of widths. The loci store respective units of data, wherein different loci can store a respective quantity and/or quality of data. In certain applications such as security applications, it may be desirable that some of the loci 102 not carry any data at all.

The substrate 106 may be a film or layer of any of various plastics, paper, woven or non-woven web, composite, or other non-magnetic substance. The substrate 106 can be reinforced or non-reinforced. In consideration of the intended use of the device 100, the substrate 106 desirably has physical properties (e.g., tear strength, flexibility, durability, hardness, etc.) that are appropriate for the intended use of the device and that do not interfere with applied external magnetic fields.

Data writing on the device comprises forming the array of loci 102. The loci 102 can be printed, applied, or otherwise formed in a manner as generally discussed above in the first representative embodiment. During printing, a respective amount, density, mixture, and/or type (e.g., iron, nickel, or cobalt, or alloys thereof) of a suspension of particles of a magnetically responsive material ("ink") is provided at each locus 102. Thus, each locus receives a respective unit of data encoded by the respective amount, density, mixture, and/or type of magnetically responsive particles provided at the locus. The data unit can be or include a respective magnetic color, "tint," or "shade" (invisible to the human eye). In other words, the data stored in the data-storage device 100 can be a function of the amount or distribution density of magnetically responsive particles in or on each locus. Alternatively or in addition, several different types of magnetic ink can be used to achieve corresponding values of magnetic "color" or shade to the stored data. If the respective widths of the dots 102 are also controllably varied, additional information states potentially can be associated with each locus.

Upon completion of data-writing, the surface 104 and loci 102 can be coated or otherwise covered with a layer or film 108, of a suitable plastic, film-forming material, or other material, to protect the loci. The protective layer 108 desirably satisfies various specifications that can include physical properties, chemical properties, thermoset versus thermoplastic, opacity, color, etc. Alternatively, for certain applications, if the inks are sufficiently durable and tenacious after curing, the protective layer 108 is not required.

A factor pertaining to the amount of data that can be stored by the device 100 is the size of the loci 102; the smaller the loci, the greater the potential amount of data. In many instances, the size, density, and/or spacing of the loci 102 will be determined by the particular sensor ("reader") used to recall the data from the data-storage device 100. Some readers have higher resolution and thus can read smaller and/or more closely spaced dots.

Also, the larger the number of different discrete particle amounts or densities that can be selectively provided to the loci 102, the greater the potential amount of information stored by the device 100. These parameters also can be manipulated to obtain variation in magnetic color, tint, and/or shade from locus to locus. For example, if eight distinct magnetic "colors" are selectively used in forming the loci, then each locus on the surface 104 can represent any of eight possible data states, compared to only two in conventional binary (1,0) data storage. For more information, see the corresponding discussion in the first representative embodiment.

For forming a particular locus 102, the magnetic ink comprises magnetically responsive particles suspended in a carrier fluid (liquid or gaseous) suitable for the medium 106 and for the particular locus-printing technique. With liquid inks, the carrier fluid desirably is one that is readily removed (e.g., by evaporation) after deposition. Alternatively, the carrier fluid can participate in ink "curing." The carrier fluid can contain, if necessary, a binder to facilitate adhesion of the particles to the substrate. The viscosity of the ink should be practical, and can range from relatively free-flowing, as in many conventional pen inks, to a paint-like viscosity, for example. Removal or curing of the carrier fluid immobilizes the ink at the loci 102 on the surface 104 of the substrate 106.

The magnetically responsive particles in the loci 102 desirably are at least pre-aligned during printing, but before the ink dries or cures.

Data stored in the device 100 can comprise a two-dimensional array of N grey-levels sufficient to store an image, where each locus 102 represents a respective pixel or analogous portion of the image.

The data can be stored in a spatially encoded manner for increased security. Reference is made to the description of encoding in the first representative embodiment.

To read the data using a magnetic sensor, the loci 102 desirably are pre-magnetized as discussed in the first representative embodiment. Magneto-resistive (or other) heads or arrays of heads can then be used to detect changes in particle orientations as functions of field strength and locus size, and as functions of the duration of the magnetic-field level.

Variables associated with the construction and use of this embodiment include, inter alia: the type and properties of the substrate and protective layer; the type, size, shape, and density of the magnetically responsive particles in the inks selectively used during formation of the dots; the drying or curing properties of the inks; the shape of the device; and the sources, locations, and strengths of the externally applied magnetic fields.

Advantages of this embodiment include, inter alia: (1) The density of data stored by the device is greater than stored by conventional binary media. (2) The device is resistant to environmental contamination. (3) The data stored in the device are resistant to erasure or corruption, accidental or otherwise. (4) The device is not degraded by repeated reading. (5) The life-span of the device can be greater than of conventional media. (6) The device can be used for covertly storing and encoding data and imagery including fingerprint and retinal-scan data. (7) The device is difficult to counterfeit.

Third Representative Embodiment

Figure 4:
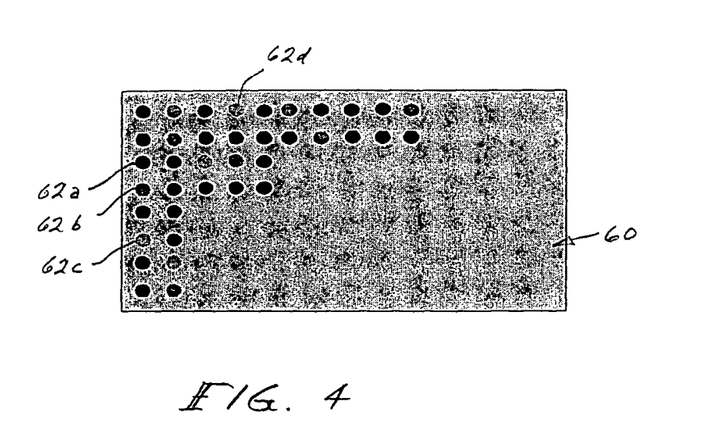

In a device 60 according to this embodiment, micro- or nano-sized loci ("dots") 62a, 62b, 62c, 62d, . . . , are printed or otherwise formed on the surface 64 of a substrate 66. The loci have magnetic properties. The loci also have selected colors (e.g., different colors of visible light, infrared light, or ultraviolet light). The colors are selected from a defined range, in contrast to the range of magnetic properties discussed in the second representative embodiment. The data that can be stored in the device 60 is a function of, inter alia, the color of each of the loci. If the width of the loci is also varied, additional information states can be associated with each locus.

The substrate 66 may be plastic, paper, woven or nonwoven web, or other suitable material upon which the inks can be printed. The dots can be printed or otherwise deposited on the surface 64 in a manner as described in the second representative embodiment. Upon completion of dot-printing, the substrate desirably is coated with a suitable material (e.g., plastic) for protection of the dots, as discussed generally in the second embodiment.

The larger the number of possible dot colors (and dot diameters), the greater the potential information content of the device 60. For example, if eight distinct colors (or tints or shades) are used in printing the dots, each dot can represent any of eight possible data states, compared to only two in conventional binary (1,0) data storage. FIG. 4 depicts an exemplary substrate 66 printed with four different colors of dots 62a, 62b, 62c, 62d (wherein each dot "color" in the figure has a different respective gray-density). The meaning and/or data state of each color is pre-defined and is interpreted during optical reading and decoding, if necessary, of the data.

The dots desirably are very small (in the micro- to nano-size range). The dots need not be round; they can be square, for example. Also, separation of the loci from one another is not necessary and can yield a decrease in storable data density.

The device 60 also can also be used to represent or store two-dimensional N grey-level image data, in which each locus on the substrate represents a respective pixel, or analogous unit, of an image.

In this embodiment, the data can be stored in a spatially encoded manner for increased security. Reference is made to, for example, the description of encoding in the first representative embodiment.

In this embodiment, the data stored in the loci are read optically as well as magnetically, wherein a discrete value is associated with each of the data-color states.

Variables associated with construction and use of this embodiment include, inter alia: the number of colors used; and the number of locus sizes used.

Advantages of this embodiment include, inter alia: (1) The information/data density achieved by the device is greater than achieved by conventional binary media. (2) Printing and construction of the substrate is simple and inexpensive. (3) The data stored in the device is resistant to erasure or corruption, accidental or otherwise. (4) The device can be used for covertly storing and encoding data and imagery including fingerprint and retinal-scan data. (5) The device is difficult to counterfeit.

Fourth Representative Embodiment

In the first embodiment, the loci are described as being discrete from one another. This fourth embodiment is based on, inter alia, a situation in which the loci are sufficiently close to one another that their respective holes essentially form a continuum with each other, at least in one direction. A continuum in one direction can be termed a "cut," and each cut can be configured as a respective "strip."

Figure 6:
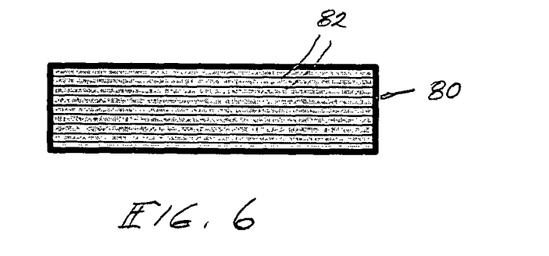
FIG. 6 shows an arrangement of a series of cuts on the surface of a medium, according to the fourth representative embodiment. The width of each cut and the distance between cuts may be varied. The narrower each cut and the closer the spacing between adjacent cuts, the greater the information content that may be recorded in the medium per unit area of the medium.

Referring to FIG. 6, one or more cuts 82 are formed in a suitable medium 80 (e.g., a thin film made of plastic or other suitable material). The strips cuts can be formed by engraving, etching, cutting, exposure to an energy beam (e.g., laser or electron beam) or other suitable technique, and extend depthwise into the medium 80. The cuts 82 can be formed as a cross-hatch of etched strips or nested squares, for example. The width of each cut 82 and the distance between cuts may be varied. The narrower each cut and the closer the spacing between adjacent cuts, the greater the information content that may be stored in the medium 80.

Figure 5:
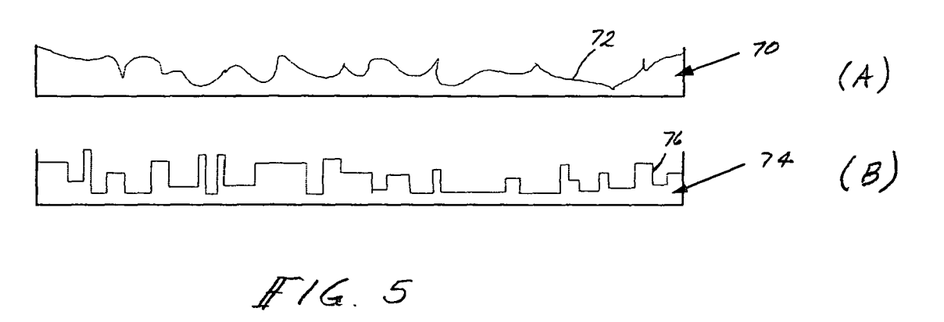
FIG. 5(A) shows exemplary analog data.
FIG. 5(B) shows exemplary digital data. The data are recorded in each cut as a function of the depth and depth variability of the cut.

Analog or digital data are encoded in the cuts 82 as functions of the depth and depth variability of the cuts. FIG. 5(A) depicts a section of medium 70 including an exemplary cut 72 for analog data. FIG. 5(B) depicts a section of medium 74 including an exemplary cut 76 for digital data. The data in each section is set forth as a continuum along the respective cut. Note that analog data can be readily converted to corresponding digital data by Fourier processing.

After forming the cuts 82, the medium 80 is inked with an ink of magnetically responsive particles. The ink in applied in a manner by which the areas between cuts are free of ink as the ink in each cut forms a respective continuum. For protection after inking, the medium desirably is coated with a protective layer (e.g., plastic).

To read the data using a magnetic sensor, the cuts desirably are pre-magnetized as discussed generally in the first representative embodiment. Magneto-resistive (or other) heads or arrays of heads can then be used to detect changes in field strength as functions of the amount and type of magnetic material in the cuts.

As noted, this embodiment is similar in certain ways to the first representative embodiment, except that, in this fourth embodiment, holes of varying depth are situated sufficiently close together as to be magnetically readable as a continuum. The data in this embodiment typically are read in a particular order (e.g., in a raster manner) in order to recover the data in a "sense" manner. However, encoding can be achieved by, for example, reading the data in a different (non-sense) order, followed by decoding.

Advantages of this embodiment include, inter alia: (1) The information/data density achieved by the device is greater than for conventional media. (2) The device is resistant to environmental contamination. (3) Surface blemishes tend not to degrade functioning of the device. (4) The data stored in the device are resistant to erasure or curruption. (5) The device is not degraded by repeated reading. (6) The life-span of the device is greater than of conventional media. (7) The device can be used for covertly storing and encoding data and imagery including fingerprint and retinal-scan data. (8) The device is difficult to counterfeit.

In several of the embodiments described above, the term "dot" is used to denote a respective locus. As noted above, the "dots" need not be circular, but rather may be of any shape and size. Additionally, dot spacing and density may be varied as a function of the particular application. It may be desirable in security applications, for example, that some of the dots carry no information at all. The greater the number of information levels that can be associated with a single locus on or in the medium or substrate, the greater the ability of the device to store information and larger amounts of information. For example, in the third representative embodiment, colored dots are printed on the substrate. If 2000 colors are printed and can be optically distinguished, then each color could be associated with a word in the English language. In English, 2000 words is sufficient for a basic speaking vocabulary.

In one or more of the embodiments, as applicable, various alternatives are possible, as follows: (a) Other suitable media can be used to suspend the magnetically responsive particles, such as (but not limited to) glass-like compounds, salts, or other materials exhibiting suitable phase-changing properties when exposed to the energy beam. Salts would undergo a phase change from solid to liquid. Phase-change media allow for a dramatic change in mobility of the particles. (b) Any of various UV-curable epoxies is another candidate material for the medium. Alternatively, any of various heat-curable epoxies or resins can be used. (c) During data reading, the device can be magnetized in one direction and read. Then, the device can be magnetized in a second, third, . . . , etc., direction(s) and read repeatedly to determine even more decisively the orientations of the particles in the loci.

Whereas the invention has been described in connection with several representative embodiments, it will be understood that it is not limited to those embodiments. On the contrary, the invention is intended to encompass all modifications, alternatives, and equivalents as may be included within the spirit and scope of the invention, as defined by the appended claims.

What is claimed is:

1. A data-storage device, comprising:
   a medium having a surface; and
   a plurality of data-containing loci arranged on the surface, each locus having a respective amount of magnetically responsive particles, the respective amounts being selected from a range of amounts and being different in at least some of the loci, wherein the respective amount at a particular locus corresponds, at least in part, to a respective unit of data stored by the locus,
   wherein the magnetically responsive particles in each locus are of a respective type selected from a range of multiple selectable types, such that at least some of the loci have different types;
   the selectable types differ from each other by at least one characteristic selected from the group consisting of material type, particle size, particle shape, particle density, and particle distribution; and
   the selected type at a particular locus corresponds, at least in part, to the respective unit of data stored by the locus.

2. The device of claim 1, wherein the loci have respective depths corresponding, at least in part, to the respective units of data contained by the loci.

3. The device of claim 1, wherein the loci have respective widths corresponding, at least in part, to the respective units of data contained by the loci.

4. The device of claim 1, wherein the plurality of loci are arranged so as to code the data in a spatial manner.

5. The device of claim 1, wherein at least some of the loci include a respective light-affecting property rendering said loci both magnetically and optically readable.

6. A data-storage device, comprising:
   a medium comprising a surface;
   a plurality of data-containing loci arranged on the surface, the loci including respective holes extending respective depths into the medium, the respective depths being different in at least some of the data-containing loci, wherein the respective depth of a data-containing locus corresponding, at least in part, to a respective unit of data contained in the locus;
   wherein each hole contains a respective amount of magnetically responsive particles, the amounts being different among at least some of the loci and being magnetically readable;
   wherein at least some of the loci also have a light-affecting property, of which respective values are different among some of the loci and are optically readable; and
   wherein the magnetically responsive particles in respective holes of a first group of the loci are of a first type and the magnetically responsive particles in respective holes of a second group of the loci are of a second type different from the first type sufficiently to confer different respective shades of magnetic response of the second group compared to the first group.

7. The device of claim 6, wherein each hole has a respective width that is a selected one in a range of multiple selectable widths, the respective widths being different in at least some of the loci and corresponding, at least in part, to the respective unit of data contained in the locus.

8. The device of claim 6, wherein respective depth, width, and type of particles for each hole are independently selected based, at least in part, on an intended shade of magnetic response of the hole.

9. The device of claim 6, wherein a respective amount of magnetically responsive particles in the hole of each data-containable locus substantially corresponds at least to the respective depth of the hole.

10. The device of claim 6, wherein the magnetically responsive particles in the holes are magnetically aligned in at least one direction.

11. The device of claim 6, wherein the loci are distributed relative to each other so as to define a continuum of hole depth from one hole to the next.

12. The device of claim 6, wherein the first and second types are distinguishable based on at least one characteristic selected from the group consisting of material type, magnetic-particle size, magnetic-particle shape, magnetic-particle density, and magnetic-particle distribution.

13. A data-storage device, comprising:
a medium having a surface; and
a plurality of multiple, discrete, data-containing loci arranged on the surface, each data-containing locus having a respective dimension on the surface that is different in at least some of the loci, the respective dimension corresponding to a respective unit of data contained in the locus;
wherein each data-containing locus includes a respective amount of magnetically responsive particles, the amounts being different among at least some of the loci and being magnetically readable; and
wherein at least some of the loci also have a light-affecting property, of which respective values are different among some of the loci and are optically readable;
wherein the magnetically responsive particles of a first group of the loci are of a first type and the magnetically responsive particles of a second group of the loci are of a second type different from the first type sufficiently to confer different respective shades of magnetic response of the second group compared to the first group.

14. The device of claim 13, further comprising a protective layer covering the loci on the medium.

15. A method for storing data, comprising:
providing a supportive medium having a surface; distributing the data into multiple data units, wherein each data unit is representable as a respective amount of magnetically responsive particles such that at least some of the data units have different respective number of particles; and forming, on the surface, an arrangement of multiple data-containing loci and providing each such locus with a respective amount of magnetically responsive particles corresponding to its respective data unit, thereby storing the respective data units in the loci, providing each locus with a respective amount of magnetically responsive particles comprises providing each locus with magnetically responsive particles of a respective type selected from a range of multiple selectable types; the types of particles are different in at least some of the loci; and the types in the range differ from each other by at least one characteristic selected from the group consisting of material type, particle size, particle shape, particle density, and particle distribution, wherein providing the loci with respective amounts of magnetically responsive particles comprises: suspending the magnetically responsive particles in a carrier fluid; introducing respective amounts of the suspension of the loci; and curing the suspension.

16. The method of claim 15, wherein forming the arrangement comprises forming the loci as respective dots on the surface, each locus having at least a respective width corresponding to the respective amount of magnetically responsive particles at the locus.

17. The method of claim 15, wherein forming the arrangement comprises forming a respective hole at each locus, and introducing the respective amounts of magnetically responsive particles into the respective holes.

18. The method of claim 17, wherein forming the respective holes further comprises:
forming the holes contiguously with each other so as to provide a continuum of hole depth, and
representing the data units as respective depths in the continuum.

19. The method of claim 15, further comprising providing at least some of the loci with respective values of a light-affecting property, the respective values being different among the loci sufficiently to render the arrangement of loci both magnetically readable and optically readable.

20. The method of claim 15, wherein first and second types of particles correspond to first and second shades of magnetic response.

* * * * *